(12) United States Patent
Tatarnikov et al.

(10) Patent No.: US 10,699,435 B2
(45) Date of Patent: Jun. 30, 2020

(54) APPARATUS AND METHOD FOR PROVIDING VEHICULAR POSITIONING

(71) Applicant: Topcon Positioning Systems, Inc., Livermore, CA (US)

(72) Inventors: Dmitry Vitalievich Tatarnikov, Moscow (RU); Leonid Valerianovich Edelman, Moscow (RU); Aleksandr Aleksandrovich Pimenov, St. Petersburg (RU); Michail Nikolaevich Smirnov, St. Petersburg (RU); Nikolay Aleksandrovich Penkrat, St. Petersburg (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 138 days.

(21) Appl. No.: 15/769,449

(22) PCT Filed: Aug. 31, 2016

(86) PCT No.: PCT/RU2016/000589
§ 371 (c)(1),
(2) Date: Apr. 19, 2018

(87) PCT Pub. No.: WO2018/044191
PCT Pub. Date: Mar. 8, 2018

(65) Prior Publication Data
US 2018/0322653 A1    Nov. 8, 2018

(51) Int. Cl.
*G06T 7/73* (2017.01)
*G01C 21/20* (2006.01)
(Continued)

(52) U.S. Cl.
CPC ............... *G06T 7/73* (2017.01); *G01C 11/24* (2013.01); *G01C 21/165* (2013.01);
(Continued)

(58) Field of Classification Search
None
See application file for complete search history.

(56) References Cited

U.S. PATENT DOCUMENTS

| 4,817,000 | A | 3/1989 | Eberhardt |
| 8,855,929 | B2 * | 10/2014 | Zhang ............... G01C 21/165 701/480 |

(Continued)

FOREIGN PATENT DOCUMENTS

| RU | 2246098 C2 | 2/2005 |
| RU | 2542932 C1 | 2/2015 |

OTHER PUBLICATIONS

International Search Report and Written Opinion dated Jun. 8, 2017, in connection with International Patent Application No. PCT/RU2016/000589, 6 pgs.

*Primary Examiner* — Leon Viet Q Nguyen
(74) *Attorney, Agent, or Firm* — Chiesa Shahinian & Giantomasi PC (57) ABSTRACT

A vehicular positioning system utilizing multiple optical cameras having contiguous fields of view for reading coded markers having pre-determined positions for determining the position of vehicle inside a structure with a high degree of accuracy. The vehicle positioning system provides for the direct installation and use of a positioning apparatus on a vehicle with a limited number of coded markers to determine the vehicle's position to within millimeter level accuracy.

23 Claims, 5 Drawing Sheets

(51) Int. Cl.
*G01C 11/24* (2006.01)
*G01C 21/16* (2006.01)
*G06K 9/00* (2006.01)
*G06K 9/18* (2006.01)

(52) U.S. Cl.
CPC ....... *G01C 21/206* (2013.01); *G06K 9/00791* (2013.01); *G06K 9/18* (2013.01); *G06T 2207/30252* (2013.01)

(56) References Cited

U.S. PATENT DOCUMENTS

| | | | | |
|---|---|---|---|---|
| 2008/0181488 A1* | 7/2008 | Ishii | ............ | B60R 1/00 382/154 |
| 2011/0010023 A1* | 1/2011 | Kunzig | ............ | G01S 5/16 701/2 |

* cited by examiner

| Marker ID | Size | Installation Direction | Indoor Address | Type | Encoded Info |
|---|---|---|---|---|---|
| ABC | 10 x 10 | N 20 | Column 100 | 1 | Yes |
| DEF | 30 x 30 | S 10 | NW Wall Position 10 | 2 | No |
| GHI | 50 x 60 | E 30 | Fixture 53 | 3 | Yes |

240 — Marker ID; 250 — Size; 260 — Installation Direction; 270 — Indoor Address; 280 — Type; 290 — Encoded Info

APPARATUS AND METHOD FOR PROVIDING VEHICULAR POSITIONING

CROSS-REFERENCE TO RELATED APPLICATIONS

This application is a national stage (under 35 U.S.C. 371) of International Patent Application No. PCT/RU2016/000589, filed Aug. 31, 2016, which is herein incorporated by reference in its entirety.

TECHNICAL FIELD

The present invention relates to positioning systems, and, more particularly, to an apparatus and method for providing vehicular positioning within a particular environment using multiple optical cameras having contiguous fields of view in combination with coded markers.

BACKGROUND

Positioning systems for objects such as moving vehicles come in a variety of well-known configurations. For example, a global navigation satellite system (GNSS) such as the well-known US Global Positioning System (GPS), the Russian GLONASS or European GALILEO, utilize radio frequency signals and other location information received from satellites for providing outdoor location and positioning with a high degree of accuracy. However, these satellite signals become weak and attenuated for indoor applications due to their line-of-sight requirements and GPS devices, for example, have a difficult time locking onto such signals when operating indoors. Further, for example, construction vehicles operating inside a large building or domed stadium structure (on the scale of 100 meters wide and tens of meters high) require the use of robotic total stations in performing construction work and these large-scale indoor structures are, in terms of using GNSS signals, susceptible to multipath propagation effects, power loss as GNSS signals pass through construction materials, and electromagnetic and audio interference thereby making indoor positioning a challenge using GNSS signals.

As such, a variety of positioning techniques exist to facilitate indoor positioning and alleviate some of the above-detailed disadvantages with respect to using GNSS signals for indoor applications. For example, certain techniques utilizing received signal strength indication (RSSI) from Wi-Fi and Bluetooth® wireless access points have been identified, however, complex indoor environments cause these types of radio waves to propagate in dynamic and unpredictable ways thereby limiting the overall positioning accuracy using RSSI.

Another indoor positioning alternative utilizes ultrasonic sonar which transmits acoustic waves to microphones in order to approximate indoor positions. This alternative technique operates at lower frequencies than Wi-Fi based systems and attenuate significantly when passing through walls, for example, thereby potentially increasing positioning accuracy.

A further positioning technique uses optical signals, either visible or infrared, which tend to have better accuracy than RSSI and/or ultrasonic sonar given that optical signals are highly directional and do not penetrate solid objects. Such optical techniques may use well-known light identification detection and ranging (LIDAR) which is a remote sensing method, similar to radar, that uses a laser pulse transmitted by a transmitter and the light particles (photons) are scattered back to a receiver and examined for position determination. Markers and landmarks may also be used where markers are active if they contain a transmitter emitting light or passive if the reflected ambient light is utilized, and/or a landmark position can be predetermined (or determined in real-time using the well-known simultaneous localization and map building (SLAM) technique). Nevertheless, the directionality of such optical signals limits their potential reliability in certain operating environments given the necessity to properly align the receiver and transmitter associated with the optical signals.

Therefore, a need exists for an improved technique for indoor vehicular positioning within large-scale structures.

BRIEF SUMMARY OF THE EMBODIMENTS

In accordance with various embodiments, a vehicular positioning apparatus and method is provided that utilizes multiple optical cameras having contiguous fields of view for reading coded markers having pre-determined positions for determining the position of vehicle inside a particular environment (e.g., a structure) with a high degree of accuracy. Unlike conventional indoor vehicular positioning techniques based on total station or laser sensors, the disclosed embodiments provide for the direct installation and use of the positioning apparatus on the vehicle (as opposed to externally positioned devices) with a limited number of coded markers to determine the vehicle's position and deliver millimeter level accuracy which is sufficient for a majority of industrial grading and construction applications, for example. This configuration also reduces overall mechanical complexity, reduces manufacturing costs, and improves antitheft characteristics.

More particularly, in accordance with an embodiment, the position of an object (e.g., a moving vehicle) within a particular environment is determined by acquiring one set of images, in real-time (or substantially real-time) or at some defined time intervals, of at least three (3) visual markers located within the structure in which the vehicle is operating inside, as taken from the camera(s) of the positioning apparatus mounted to the object (e.g., the vehicle) for which the positioning determination is desired. In accordance with an embodiment, the set of visual markers may be any type of target marker that is of sufficient contrast and shape that such marker is readily and reliably detectable by the image acquisition module (e.g., a camera). Such visual markers may include checker-board markers, quick response (QR)-codes, barcodes (color or greyscale), surveying prisms, and contrasting circular markers, to name just a few. Each visual marker is located at a fixed (i.e., known) position within an indoor environment (e.g., within an arena and mounted on a wall or support column or post within such structure) and, in addition to the known location, the geometric features of the marker are also known (e.g., orientation and size of each marker). In accordance with the embodiment, the geometric features of each marker captured in a particular image are extracted and the indoor position of the vehicle is determined based on the extracted marker information.

When a visual marker contains multiple visible elements (such as cells in a checker-board configuration), the disclosed method can use the visible elements to further improve the accuracy of positioning. This is accomplished by matching the observed structure of visible elements with an expected structure of the visible elements, calculating the deviation (e.g., root mean square deviation) between the observed and expected structures, and updating the expectation (i.e., the expected structure) by minimizing the deviation. In order to minimize the deviation, for example, a non-linear minimization can be used. In this way, the disclosed embodiments allow for determining marker position at sub-pixel accuracy, and marker orientation can be estimated and used for precise vehicle positioning.

Another useful way to employ the information coded into the visual markers is to use a select method (many well understood methods of visual coding of information can be utilized effectively) of visual coding (e.g., by adding additional cells coding bits by black/white color, by differently alternating the colors in the checker-board, by using a variety of different colors, and/or by using QR-codes) to code the number (identifier) of marker, its coordinates and other information, which, having been detected and decoded by the positioning apparatus, will allow for to automatically corresponding the detected mark to its coordinates.

In accordance with the embodiments herein, the determination of a precise indoor position of an object (e.g., a vehicle) is facilitated by a combination of data collected from an optical system providing images of visual markers within the object's indoor environment, and data collected from inertial sensors and/or other sensor types. In this way, precise indoor positioning (e.g., within centimeters or millimeters) is achievable in large-scale indoor environments (e.g., hundreds of square meters) in the event the visual markers are not observable and images cannot be acquired for a particular time period. In addition, the position determination using only the mean of the optical system will have certain latency (delay) and frequency caused by the necessary time of taking and processing of the images, for which the delay and/or frequency might not be sufficient for the purpose of operating the vehicle, and in such case, an inertial sensor might be a source of positioning information during a short interval between two consequent position measurements with the optical sensor.

These and other advantages of the embodiments will be apparent to those of ordinary skill in the art by reference to the following detailed description and the accompanying drawings.

DETAILED DESCRIPTION

In accordance with various embodiments, an indoor vehicular positioning system is provided that utilizes multiple optical cameras having contiguous fields of view for reading coded markers having pre-determined positions for determining the position of vehicle within an indoor environment with a high degree of accuracy.

Figure 1:
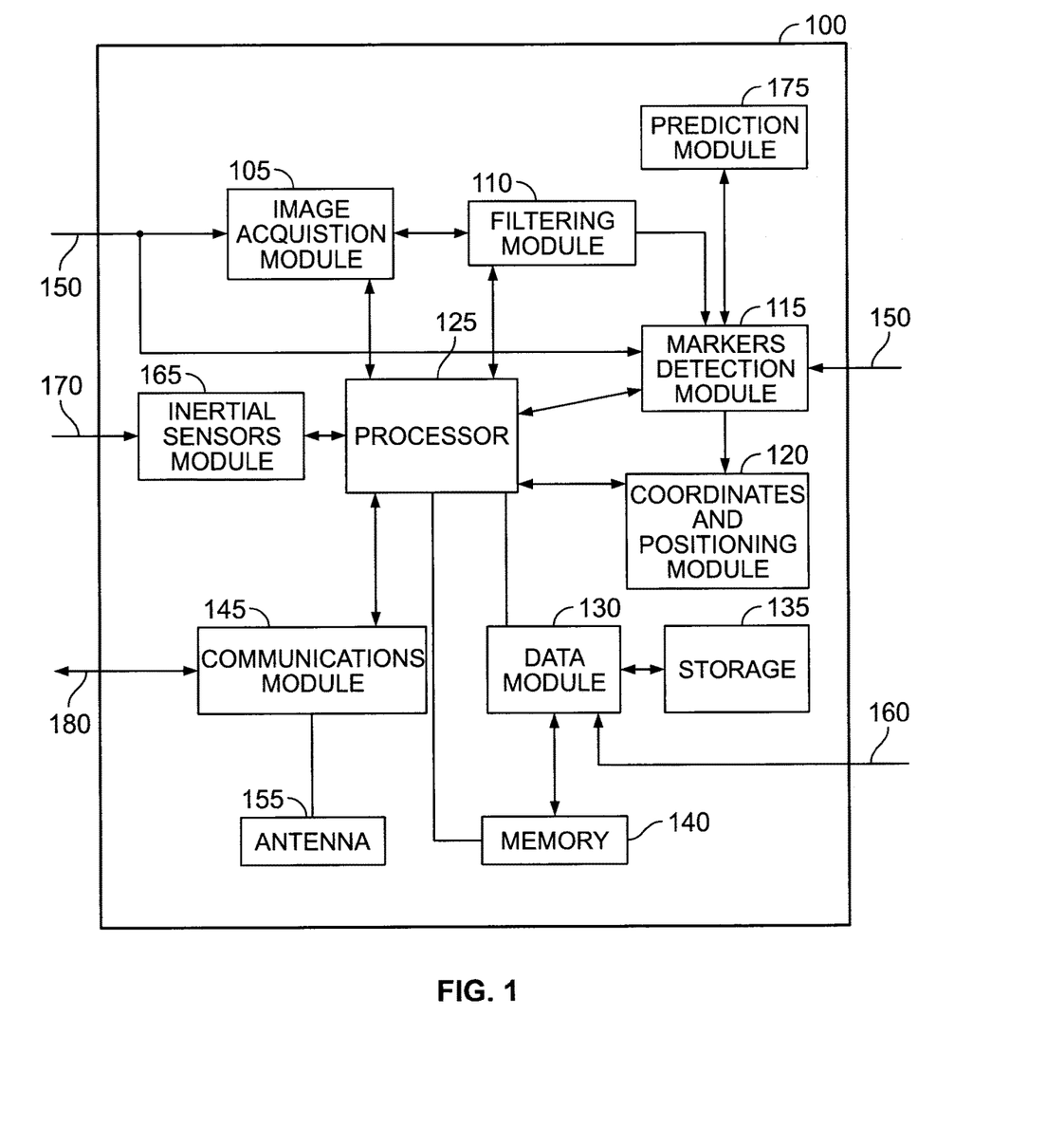
FIG. 1 shows a high-level block diagram of a positioning apparatus configured in accordance with an embodiment.

FIG. 1 shows a high-level block diagram of a positioning apparatus 100 configured in accordance with an embodiment. More particularly, apparatus 100 includes image acquisition module 105, filtering module 110, markers detection module 115, coordinates and positioning module 120, processor 125, data module 130, storage device 135, memory 140, communications module 145, inertial sensors module 165, prediction module 175, and antenna 155. Antenna 155 is utilized by positioning apparatus 100 in embodiments where communications module 145 includes radio communications interfaces, for example. Inertial sensors module 165 (this module being an optional feature in various embodiments) is used for tracking visual markers through sensory data 170 using a variety of sensors (e.g., a gyro sensor, and/or acceleration sensor) in the event the visual markers are unobservable by and through image acquisition module 105, as will be further discussed herein below. In this way, in accordance with the embodiments herein, the determination of a precise indoor position of an object (e.g., a vehicle) is facilitated by a combination of data collected from an optical system providing images of visual markers within the object's indoor environment, and data collected from inertial (or other) sensors. As will be appreciated, the operations of the various modules and components shown individually in FIG. 1 may be combined into a single module, processor, unit or device or combinations thereof.

Processor 125 (and/or any of the processing modules described herein) may be any suitable processor, computing module, data processing device, or combination of the same. Processor 125 is communicatively coupled with memory 140 and with data module 130 (and indirectly with storage device 135 through data module 130) for storing computer-readable program instructions that provide the governing logic for controlling processor 125 (and/or other processing modules herein) to execute computer-readable program instructions stored in storage device 135 or other computer readable medium. Processor 125 may include both general and special purpose microprocessors, and may be the sole processor or one of multiple processors of positioning apparatus 100. Processor 125 may comprise one or more central processing units (CPUs), for example. Processor 125 and memory 140 may include, be supplemented by, or incorporated in, one or more application-specific integrated circuits (ASICs) and/or one or more field programmable gate arrays (FPGAs).

Storage device 135 and memory 140 may each comprise a tangible non-transitory computer readable storage medium. Storage device 135 and memory 140, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Communications module 145 is a module which may include input means, such as a keypad, touchscreen, haptic controls, voice-recognition means and the like, used to identify user command input, for example. Communications module 145 also includes an output means, such as to a display, or to an external control unit which operates the vehicle, or a monitor to output images from image acquisition module 105, indicate an input command from a user, and display results of the calculation of the indoor position of vehicle, for example. Such communications may be exchanged by any number of well-known communications protocols such as Ethernet, Universal Serial Bus (USB), or Controller Area Network (CAN) bus, to name just a few. Communications module 145 may also include a user input/output device interface, which interfaces with a computer (not shown) with the user input/output. Examples of the user input/output device may include a keyboard, a mouse, a touchscreen, a microphone (for voice-activated input), and a local access terminal. The communications module 145 may further include a display interface, which interfaces the computer with a display for the display of data and images.

Communications module 145 may further include a GNSS receiver interface (not shown), which interfaces positioning apparatus 100 with a GNSS receiver (not shown) for receiving signals and measurements from the GNSS receiver (e.g., via communications signals 180) through the GNSS receiver interface. Further, communications module 145 may further include a total station interface, which interfaces positioning apparatus 100 with a total station operating within the indoor environment.

Figure 3:
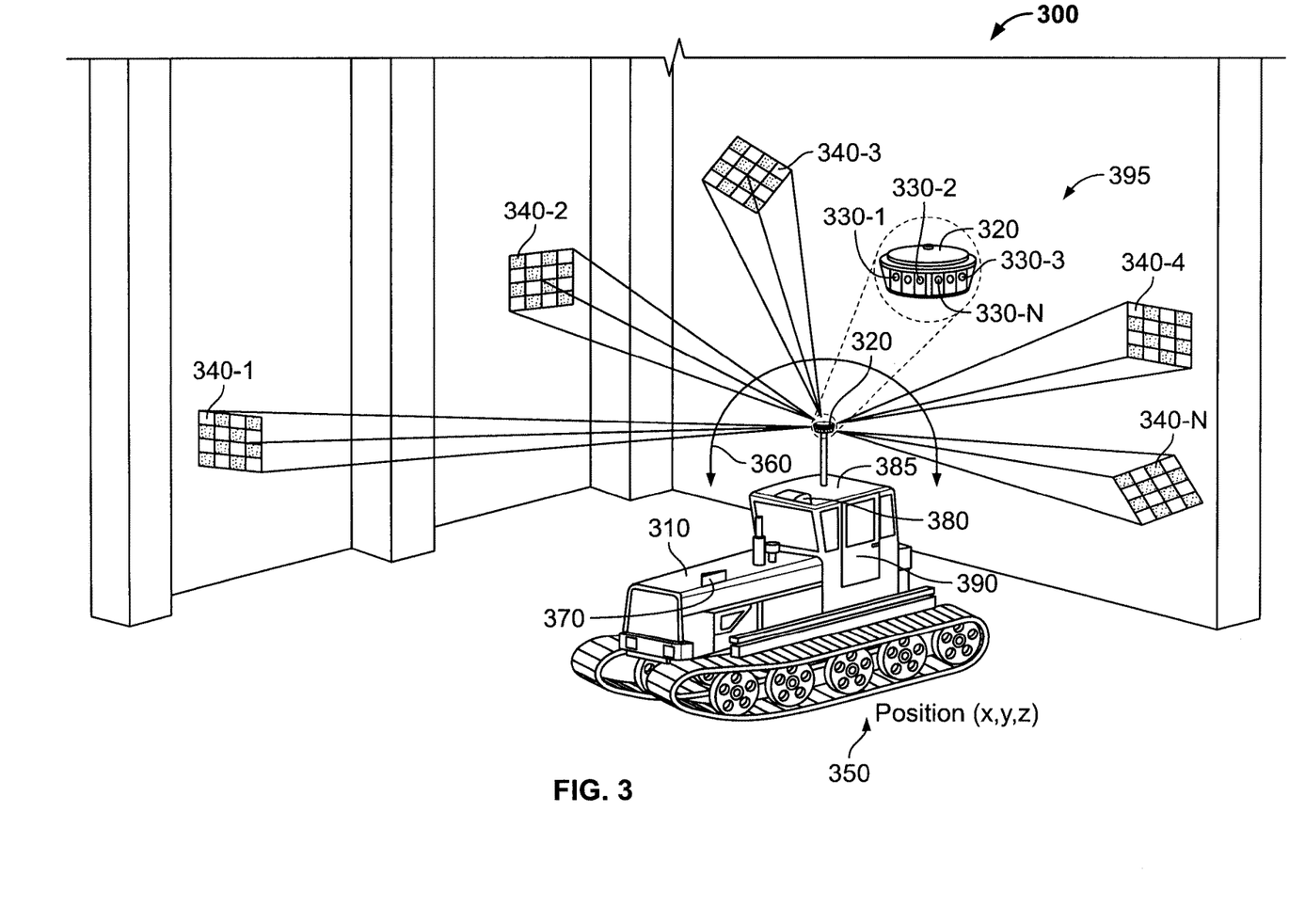
FIG. 3 shows a diagram of the use of a positioning system in accordance with an embodiment.

Image acquisition module 105 and markers detection module 115 are configured so each receives image input 150 generated from one or more image capture devices such as any type of camera, with one camera type preferably having a low distortion lens and high temperature stability in order to maintain image accuracy even in the midst of a harsh mechanical and/or thermal environment (e.g., a mining operation or tunnel). Such cameras (for example, camera unit 320 as depicted in FIG. 3 herein) may have one or more optical sensors, multiple optical elements and/or panoramic capabilities. The configuration of image acquisition module 105 for capturing images of visual markers for positioning determination (e.g., indoor positioning) is further detailed herein below. In accordance with an embodiment, image acquisition module 105 is configured for operation with cameras that may be a matrix Charge-Coupled Device (CCD) sensor the operation of which is well-known in the art, coupled with a suitable optical lens. Alternatively, the camera(s) may be multiple CCD sensors coupled with respective lenses thereby providing a 360 degree or wide-angle image. For example, as shown in FIG. 3, camera unit 320 comprises a plurality of cameras (i.e., camera 330-1, 330-2, 330-3, and 330-N) having well-known optics capabilities that are configured rigidly on a moving object (e.g., vehicle 310) and directed in different directions, with contiguous fields of view, resulting in a total 360 degree field of view (e.g., field of view 360). In accordance with various embodiments, camera alignment and optical characteristics are defined at the time of manufacture or during vehicle installation. In accordance with further embodiments, one or more of the plurality of cameras have fields of view that overlap.

As noted above, in accordance with an embodiment, the indoor position of a vehicle is determined by simultaneously acquiring a set of images, in real-time (or substantially real-time) or at certain defined time intervals, of three (3) or more markers using multiple image capture devices (e.g., cameras) with contiguous fields of view, where the position and orientation of each camera with respect to the vehicle is known (and, illustratively, stored for further access and use). Illustratively, the set of images captures images of a set of visual markers located within the indoor environment (e.g., a building) in which the vehicle is operating inside. In accordance with an embodiment, the set of visual markers, the position of each marker being defined by and known within the applicable coordinate system of the worksite or applicable area for which positioning is being undertaken, may be any type of target marker that is of sufficient contrast and shape that such marker is readily and reliably detectable by the image capture device (e.g., a camera). In this way, by using markers consisting of varying and/or multiple elements the overall accuracy of estimating marker position in an image is improved given the enhanced ability to detect varying/multiple elements from the marker (and their corresponding positions). For example, by using an optimization technique and solving therefore, an estimate of a probable position on the image for the center of the marker (or other points, as required) may be determined given the measured points of all the marker elements. Such visual markers may include checker-board markers, quick response (QR)-codes, barcodes (color or greyscale), surveying prisms, and contrasting circular markers, to name just a few.

Figure 2A:
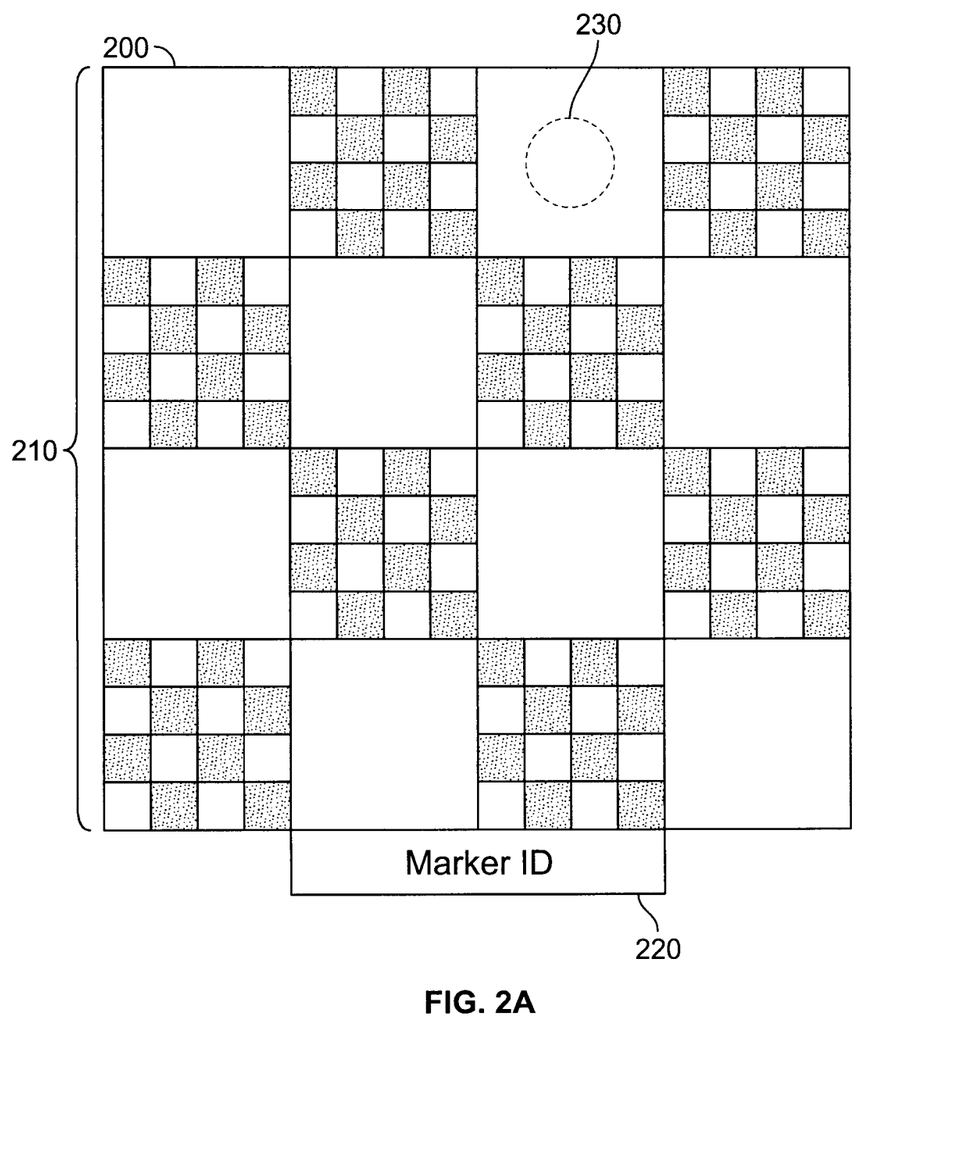
FIG. 2A shows an exemplary visual marker in accordance with an embodiment.
Figure 2B:
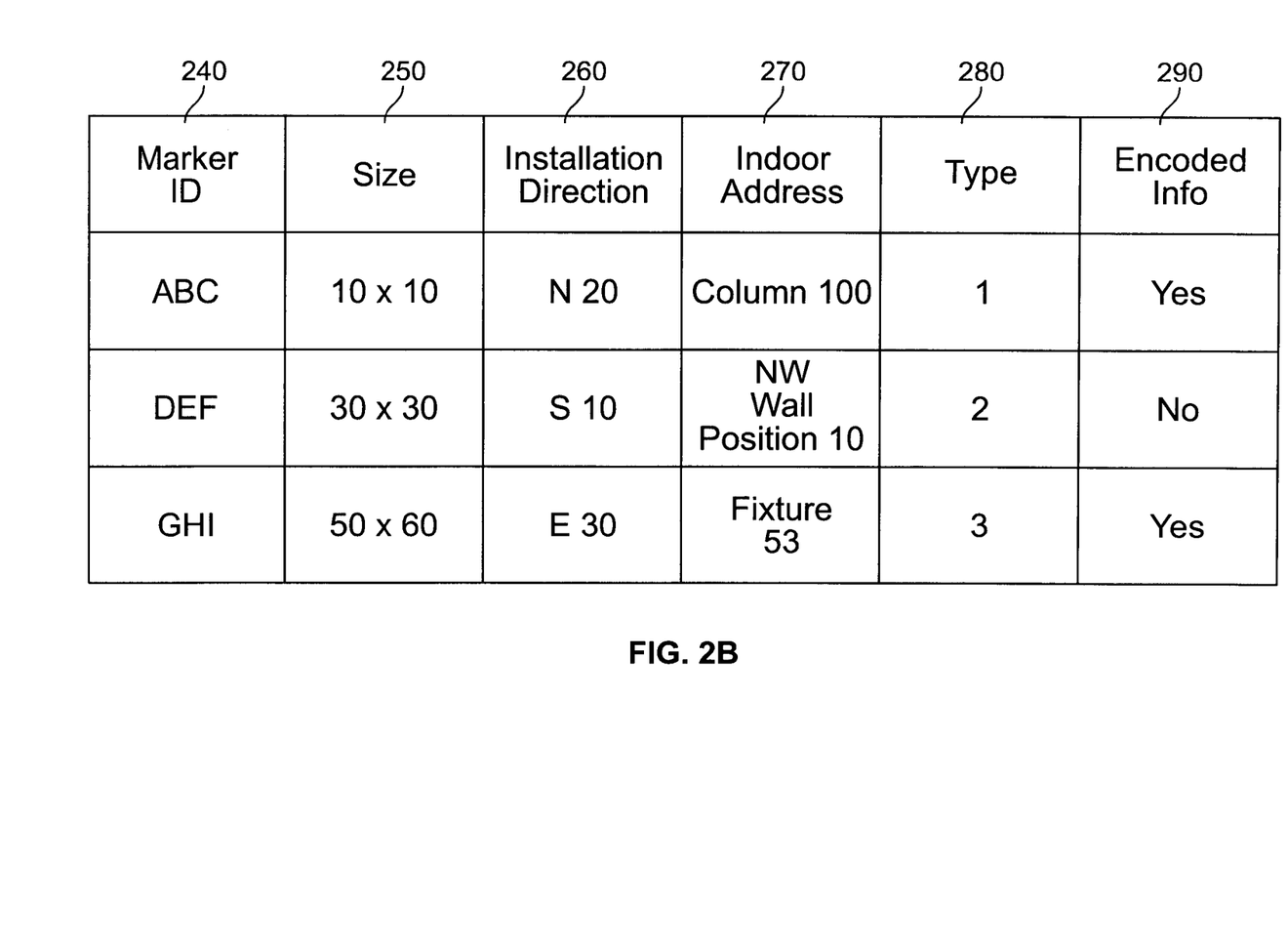
FIG. 2B shows a diagram of exemplary visual marker information associated with the visual marker of FIG. 2A in accordance with an embodiment.

FIG. 2A shows an exemplary visual marker 200 in accordance with an embodiment, and FIG. 2B shows a diagram of exemplary information associated with visual marker 200 in accordance with an embodiment. In particular, visual marker 200 is configured as a checker-board marker having checkerboard pattern 210 consisting of a plurality of alternating squares having different visual patterns. Marker identification 220 illustratively serves as an exemplary unique identifier for visual marker 200 in order to easily identify the marker and register information associated with visual marker 200 for storage in a database, for example. As shown in FIG. 2B, the exemplary visual marker information may include marker ID 240, marker size 250 (e.g., 10×10), marker installation direction 260 (e.g., north 20 degrees), marker indoor address 270 (e.g., column #100), marker type 280, and encoded information 290. The encoded information 290 is an indication that the particular marker has certain information encoded within the marker itself. For example, as shown in FIG. 2A, visual marker 200 includes encoded information 230 such as the exact location of visual marker 200 or other metadata associated with the visual marker 200 or the indoor environment in which the marker is mounted, for example. As will be appreciated, other well-known visual encoding techniques may also be utilized effectively and within the principles of the disclosed embodiments.

As will be noted, the characteristics of the visual markers herein (such as visual marker 200 which is one of many possibilities) are that the marker must be of sufficient contrast and shape for detection, easily and reliably, by image acquisition module 105, markers detection module 115, and the associated cameras (e.g., cameras 330-1 through 330-N) capturing the images of the visual markers and producing image input 150. In addition to the checkerboard configuration of visual marker 200, the visual markers may also include quick response (QR)-codes, barcodes (color or greyscale), surveying prisms, and contrasting circular markers, to name just a few. As illustrated in FIG. 3 herein, each visual marker is located at a fixed (i.e., known) location inside the structure (e.g., mounted on a wall or support column or post) and, in addition to the known location, the geometric features of the marker are also known (e.g., orientation and size of each marker). In accordance with the embodiment, the geometric features of each marker captured in a particular image are extracted therefrom (e.g., using well-known convolution techniques or corner detection techniques such as the Harris corner detector) and the indoor position of the vehicle is determined based on the extracted marker information.

As noted above, in accordance with various embodiments, an indoor vehicular positioning system is provided that utilizes multiple optical cameras having contiguous fields of view for reading coded markers having pre-determined positions for determining the position of vehicles inside an indoor environment with a high degree of accuracy. In particular, image acquisition module 105 receives images from one or more cameras associated with the plurality of visual markers (i.e., image input 150) Image acquisition module 105 is further configured to optionally define regions of interest around a visual marker's predicated position. As will be appreciated, a number of methods for predicting marker position can be utilized, for example, a vehicle movement model or optical flow algorithm. Alternatively, as noted above, optional inertial sensor(s) can be utilized to define velocity and direction of vehicle movement. Filtering module 110 analyzes image input 150 and may normalize image qualities such as brightness and contrast and send image parameters to image acquisition module 105 for improving the overall image quality received from the cameras via image input 150.

Markers detection module 115 receives image input 150 as well as information associated with the configuration of the plurality of visual markers and their potential location and size as determined by prediction module 175. In particular, prediction module 175 using known coordinates associated with the plurality of visual markers will predict a position in the frame of the respective marker from the camera image taken and the size of the marker. The markers detection module 115 will extract any encoded information (e.g., encoded information 230) from image input 150, and using image input 150 in combination with the prediction information received from predication module 175, will search for a visual marker image with the most likely positions. That is, the prediction module will define an area where the vehicle may appear in a given amount of time, and every point in the defined area may be projected to the camera(s). Thus, all points in the defined area produce a number of regions, in the camera(s), where the markers may appear in a certain time interval, and these regions may be utilized to optimize and/or accelerate the marker detection operations. In this way, prediction module 175 has prediction ability as a function of the movement model and/or one or more inertial measurements (e.g., processed by inertial sensors module 165) that is focused on the marker position (s) in the corresponding regions. As such, this translates into an overall decrease in the time to make one or more measurements thereby increasing the frequency of measurements and reducing associated time delays while maintaining overall accuracy of the vehicular positioning at higher vehicle speeds.

The predictions made by prediction module 175 may also be utilized by image acquisition module 105 to define, expand or restrict, for example, the areas from which image input 150 is desired within the indoor environment. Image input 150 is also utilized by markers detection module 115 to identify the specific marker ID (e.g., marker ID 220) associated with a particular visual marker (e.g., visual marker 200).

The search results from markers detection module 115 are provided to coordinates and position module 120 which will calculate the horizontal and vertical angle to each marker from the corresponding camera based on the location of the marker within the respective image. As will be appreciated, improved accuracy may be obtained in further embodiments using the location of elements of the marker (e.g., cells, corners, or parts of the QR-code) within the image. The calculated angles, from image input 150, are used in combination with known data of the indoor environment, with position and orientation of each camera with respect to the vehicle, and data from other sensors for determining a precise indoor position using well-known techniques in the field of geodesy (e.g., 3D resection).

The data from other sensors is sensory data 170 which is collected by and through inertial sensors module 165. That is, the determination of a precise indoor position of an object (e.g., a vehicle) is facilitated by a combination of data collected from an optical system providing images of visual markers within the object's indoor environment, and data collected from inertial (or other) sensors, in the event the visual markers are unobservable (or have reduced visibility) by the cameras capturing image input data 150 for provision to image acquisition module 105, or to provide the measurement of position in between two consequent measurements with optical means, in order to reduce the delay and/or increase the frequency of the position measurement as required. These sensors may include a wide variety of sensors (e.g., a gyro sensor and/or acceleration sensor). Data module 130 updates the data from image acquisition module 105 and inertial sensors module 165, and supports the execution of the overall motion model employed by positioning apparatus 100 in a well-known fashion. For example, in accordance with an embodiment the motion model can be an approximation of the movement of a particular vehicle with its given limitations for speed and acceleration, and a Kalman filter or variation could be used to integrate the position or angle measurements from the optical system with the acceleration measurements from the inertial sensors. As such, data module 130 can provide predictions of the position at the time that a camera provides a next image (via image input 150) to image acquisition module 105, by integrating the acceleration measurements from the inertial system and/or extrapolating the previous positions. Data module 130 may also receive a variety of information (e.g., information 160) from sources external to positioning apparatus 100 such as the visual marker information (see, e.g., FIG. 2B) which may be stored in an external database.

In an embodiment for combined indoor/outdoor or strictly outdoor applications, as shown in FIG. 3, an optional inertial measurement unit (IMU) 370 is mounted on vehicle 310 (illustratively shown as a dozer). As will be appreciated, IMU 370 may include one or more orthogonally-mounted accelerometers and one or more orthogonally-mounted gyros, where each accelerometer measures the acceleration along a coordinate axis, and each gyro measures the angular rate (time derivative of rotation angle) about a coordinate axis, all in well-known fashion. In this way, as detailed above, image data from the cameras is combined with data received from certain inertial sensors (e.g., IMU 370) for the determination of the indoor position (i.e., position 350) of vehicle 310 in terms of three-dimensional (x, y, z) coordinates.

As also shown in FIG. 3, GNSS sensor 380 is mounted on the roof 385 of cab 390. The GNSS sensor 380 is electrically connected via a cable to a GNSS receiver (not shown) housed within cab 390. In some installations, the GNSS receiver is also mounted on the roof. The GNSS sensor 380 can be used to measure the absolute roof position in the applicable coordinate system in a well-known fashion.

FIG. 3 shows a diagram of the use of an indoor positioning system 300 in accordance with an embodiment. As shown, vehicle 310 (e.g., a dozer) includes GNSS sensor 380 mounted on roof 385, as noted above for receiving information, from and to a variety of communications networks, in a conventional and well-known manner. Also mounted from roof 385 is camera unit 320 which includes a plurality of camera devices, i.e., camera 330-1, 330-2, 330-3, and 330-N. As noted above, in accordance with an embodiment, cameras 330-1 through 330-N are each a panoramic camera such that these cameras have contiguous fields of view (e.g., fields of view 360). As will be appreciated, in further embodiments, these cameras may be, for example, single-view cameras or stereoscopic-view cameras which a stereoscopic-view camera can have a single camera body with two lenses, or a stereoscopic-view camera can be configured from two separate single-view cameras. In accordance with further embodiments, one or more of the plurality of cameras (e.g., camera 330-1 and 330-2) have overlapping fields of view (either supplemental to one or more of the contiguous views or in replacement thereof).

The camera unit 320, therefore, facilitates the capturing of individual images of the visual markers, i.e., visual marker 340-1, 340-2, 340-3, 340-4, and 330-N (as shown each such visual marker is a checkerboard marker configured substantially the same as visual marker 200, as detailed above). The individual markers are referenced to the geodesic grid in a well-known fashion for purposes of using the individual coordinates associated with visual marker 340-1, 340-2, 340-3, 340-4, and 340-N to building a 3D coordinate system model associated with indoor environment 395 in which vehicle 310 is currently located.

In accordance with the embodiments herein, images of at least three (3) different visual markers are necessary but may be desirable to capture images of more than 3 different visual markers captured by camera unit 320 in order to have a certain redundancy in measurements to facilitate outlier detection, and/or to improve the accuracy of the positioning by averaging or other similar mathematical method. As such, this provides a certain self-diagnostic or correction feature (e.g., incorporated within markers detection module 115, or coordinates and positioning module 120, or as a stand-alone module) in accordance with further embodiments that is useful either at the time of initial system installation and/or during the system's useful life to ensure on-going accuracy and proper positioning is maintained in accordance with various embodiments. More particularly, utilizing more than 3 different visual markers provides for a certain measurement redundancy thereby improving the ability to detect and/or correct for possible outlier(s) in positions/coordinates (i.e., erroneous positions/coordinates) in situations, for example, where markers may have been moved from a prior established position, or their respective coordinates cannot be measured or recorded correctly at a particular time. In such cases, the erroneous coordinates associated with the marker may be detected, and new coordinates are estimated for the associated set of coordinates by observing this marker from at least two different positions together with at least 3 other markers having known (i.e., correct) coordinate positions. This establishes, through the newly estimated coordinates, a corrected position for the previous outlier marker.

Figure 4:
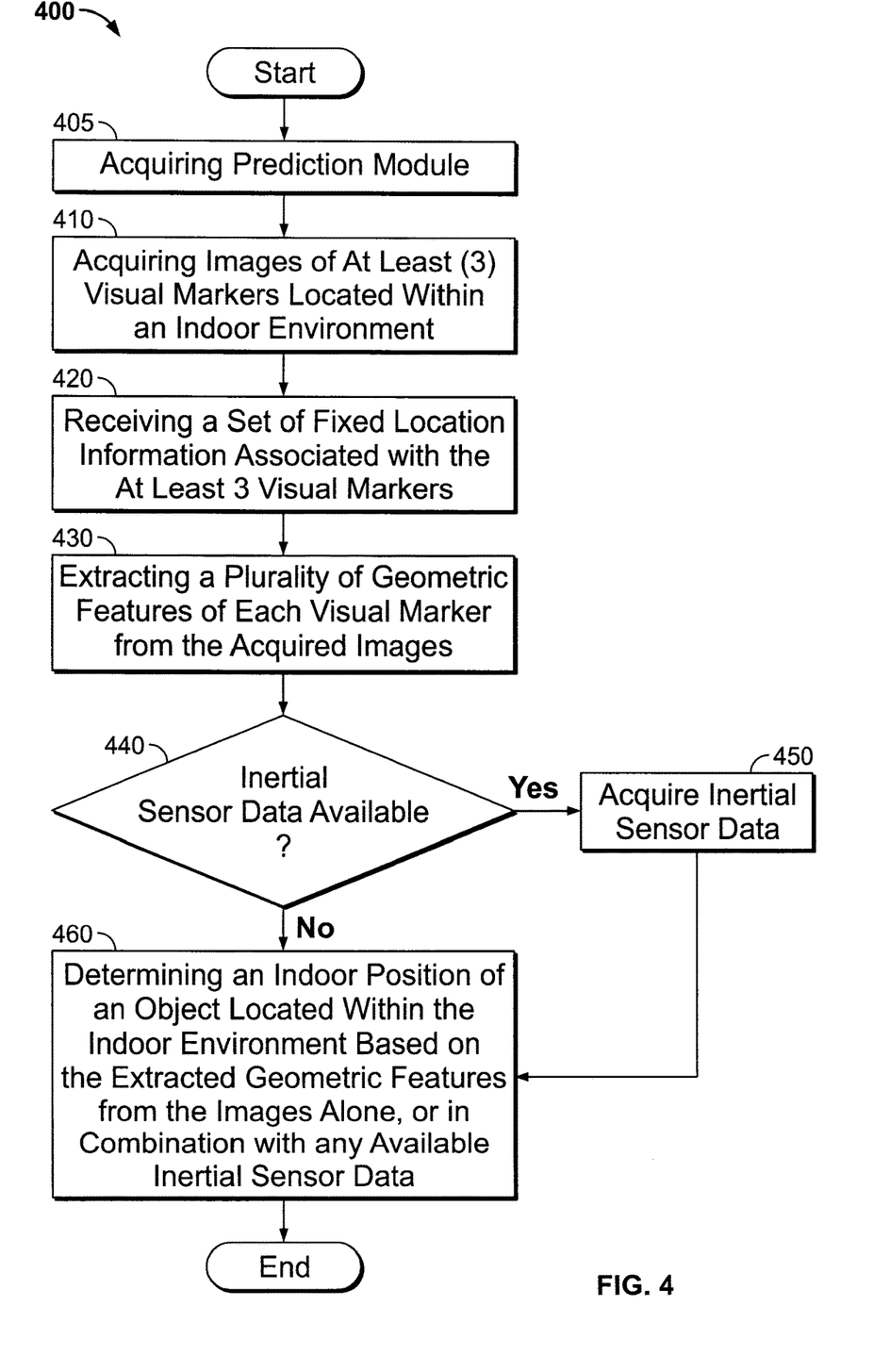
FIG. 4 shows a flowchart of illustrative operations for determining positioning of an object in accordance with an embodiment.

FIG. 4 shows a flowchart of illustrative operations 400 for determining positioning of an object in accordance with an embodiment. Illustratively, such operations are performed by positioning apparatus 100 in accordance with an embodiment. At step 405, the prediction module is optionally acquired for use in predicting the position which is used in determining the region within each camera where an image of a particular marker(s) shall appear. As shown, at step 410, images of at least three (3) visual markers located within an indoor environment are acquired, and, at step 420, a set of fixed (known) location information associated with the at least three visual markers is received. A plurality of geometric features are extracted, at step 430, of each visual marker from the acquired images, as detailed above. At step 460, and if no inertial sensor data is available, the indoor position of the object located within the indoor environment is determined from the extracted geometric features from the images alone. However, if inertial sensor data is available, at step 440, that inertial sensor data (or the result of integration of such sensor data) is acquired, at step 450 and the available inertial sensor data is combined with the extracted geometric feature data to determine the indoor position of the object (e.g., a vehicle), at step 460, located within the indoor environment.

It should be noted that for clarity of explanation, the illustrative embodiments described herein may be presented as comprising individual functional blocks or combinations of functional blocks. The functions these blocks represent may be provided through the use of either dedicated or shared hardware, including, but not limited to, hardware capable of executing software. Illustrative embodiments may comprise digital signal processor ("DSP") hardware and/or software performing the operation described herein. Thus, for example, it will be appreciated by those skilled in the art that the block diagrams herein represent conceptual views of illustrative functions, operations and/or circuitry of the principles described in the various embodiments herein. Similarly, it will be appreciated that any flowcharts, flow diagrams, state transition diagrams, pseudo code, program code and the like represent various processes which may be substantially represented in computer readable medium and so executed by a computer, machine or processor, whether or not such computer, machine or processor is explicitly shown. One skilled in the art will recognize that an implementation of an actual computer or computer system may have other structures and may contain other components as well, and that a high level representation of some of the components of such a computer is for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for determining a position of an object located within a particular environment, the method comprising:

acquiring, from an image acquisition module, a set of images of at least three coded visual markers, each coded visual marker having a fixed location within the particular environment, and each image of the set of images associated with at least one respective different one coded visual marker of the at least three coded visual markers, the image acquisition module acquiring the set of images from a plurality of cameras;

acquiring inertial sensor data associated with the object;

extracting from the set of images a set of geometric features associated with each of the respective different one coded visual marker of the at least three coded visual markers;

predicting, from a prediction module, a position of one of the respective different one coded visual markers in a particular frame of the image associated with the one respective different one coded visual marker; and determining the position of the object using the inertial sensor data in combination with the set of geometric features associated with each respective different one coded visual marker of the at least three coded visual markers.

2. The method of claim 1 further comprising:
receiving a set of visual marker information associated with at least one of the respective different one coded visual markers, the set of visual marker information including a marker location, and at least one of a marker orientation, a marker identifier, a marker type, and a marker size.

3. The method of claim 2 wherein the at least one respective different one coded visual marker is configured with one of a checkerboard pattern, a quick response code, and a barcode.

4. The method of claim 1 wherein each camera of the plurality of cameras has an associated field view such that the associated fields of views of the plurality of cameras are contiguous.

5. The method of claim 1 wherein the object is a vehicle.

6. The method of claim 1 wherein the inertial sensor data is acquired from at least one of a gyro sensor and an acceleration sensor.

7. The method of claim 5 wherein the particular environment is an indoor environment.

8. The method of claim 1 wherein the image acquisition module and the plurality of cameras are mounted on the object.

9. The method of claim 7 wherein at least one of the respective different one coded visual marker of the at least three coded visual markers includes encoded information specifying a location of the at least one respective different one coded visual marker within the indoor environment.

10. The method of claim 1 further comprising:
defining, by the prediction module, an area where the object may appear in a particular time interval, the area having a plurality of regions, each region having a plurality of points, and wherein multiple points are projected to the plurality of cameras.

11. The method of claim 1 further comprising:
detecting an error in a set of coordinates associated with a position of one of the respective different one coded visual markers; and
correcting the set of coordinates associated with the position, by estimating revised coordinates for the set of coordinates through observing, using the plurality of cameras, the one of the respective different one coded visual markers from at least two different positions together with at least three other ones of the respective different one coded visual markers having respective known coordinate positions.

12. A positioning apparatus for determining a position of an object located within a particular environment comprising:
a processor;
a memory coupled with the processor, the memory having a program that stores computer program instructions that when executed cause the processor to perform operations for:
acquiring, from an image acquisition module, a set of images of at least three coded visual markers, each coded visual marker having a fixed location within the particular environment, and each image of the set of images associated with at least one respective different one coded visual marker of the at least three coded visual markers, the image acquisition module acquiring the set of images from a plurality of cameras, each camera of the plurality of cameras having an associated field of view such that the associated fields of views of the plurality of cameras are contiguous;
acquiring inertial sensor data associated with the object;
extracting from the set of images a set of geometric features associated with each of the respective different one coded visual marker of the at least three coded visual markers;
predicting, from a prediction module, a position of one of the respective different one coded visual markers in a particular frame of the image associated with the one respective different one coded visual marker; and
determining the position of the object using the inertial sensor data in combination with the set of geometric features associated with each respective different one coded visual marker of the at least three coded visual markers.

13. The positioning apparatus of claim 12 wherein the operations further comprise:
receiving a set of visual marker information associated with at least one of the respective different one coded visual markers, the set of visual marker information including a marker location, and at least one of a marker orientation, a marker identifier, a marker type, and a marker size.

14. The positioning apparatus of claim 12 wherein the object is a vehicle.

15. The positioning apparatus of claim 12 wherein the image acquisition module and the plurality of cameras are mounted on the object.

16. The positioning apparatus of claim 12 wherein the operations further comprise:
defining, by the prediction module, an area where the object may appear in a particular time interval, the area having a plurality of regions, each region having a plurality of points, and wherein multiple points are projected to the plurality of cameras.

17. The positioning apparatus of claim 12 wherein the operations further comprise:
detecting an error in a set of coordinates associated with a position of one of the respective different one coded visual markers; and
correcting the set of coordinates associated with the position, by estimating revised coordinates for the set of coordinates through observing, using the plurality of cameras, the one of the respective different one coded visual markers from at least two different positions together with at least three other ones of the respective different one coded visual markers having respective known coordinate positions.

18. A non-transitory computer-readable medium storing computer program instructions for determining a position of a vehicle traversing a particular environment, the computer program instructions, when executed on a processor, cause the processor to perform operations comprising:

acquiring, from an image acquisition module, a set of images of at least three coded visual markers, each coded visual marker having a fixed location within the particular environment, and each image of the set of images associated with at one respective different one coded visual marker of the at least three coded visual markers, the image acquisition module acquiring the set of images from a plurality of cameras, each camera of the plurality of cameras having an associated field of view such that the associated fields of views of the plurality of cameras are contiguous;

acquiring inertial sensor data associated with the vehicle;

extracting from the set of images a set of geometric features associated with each of the respective different one coded visual markers of the at least three coded visual markers;

predicting, from a prediction module, a position of one of the respective different one coded visual markers in a particular frame of the image associated with the one respective different one coded visual marker; and determining the position of the vehicle using the inertial sensor data in combination with the set of geometric features associated with each respective different one coded visual marker of the at least three coded visual markers.

19. An apparatus for determining a position of an object located within a particular environment comprising:

an image acquisition module for acquiring a set of images of at least three coded visual markers, each coded visual marker having a fixed location within the particular environment, and each image of the set of images associated with at least one respective different one coded visual marker of the at least three coded visual markers, the image acquisition module acquiring the set of images from a plurality of cameras, each camera of the plurality of cameras having an associated field of view such that the associated fields of views of the plurality of cameras are contiguous;

an inertial sensors module for acquiring inertial sensor data associated with the object;

a markers detection module for extracting from the set of images a set of geometric features associated with each of the respective different one coded visual marker of the at least three coded visual markers;

a prediction module for predicting a position of one of the respective different one coded visual markers in a particular frame of the image associated with the one respective different one coded visual marker; and a coordinates and positioning module for determining the position of the object using the inertial sensor data in combination with the set of geometric features associated with each respective different one coded visual marker of the at least three coded visual markers.

20. The apparatus of claim 19 further comprising:

a data module for storing a set of visual marker information associated with at least one of the respective different one coded visual markers, the set of visual marker information including a marker location, and at least one of a marker orientation, a marker identifier, a marker type, and a marker size.

21. The apparatus of claim 19 wherein the object is a vehicle and the particular environment is one of a domed stadium and a building.

22. The apparatus of claim 19 wherein the prediction module defines an area where the object may appear in a particular time interval, the area having a plurality of regions, each region having a plurality of points, and wherein multiple points are projected to the plurality of cameras.

23. The apparatus of claim 19 wherein the coordinates and positioning module further provides for detecting an error in a set of coordinates associated with a position of one of the respective different one coded visual markers; and correcting the set of coordinates associated with the position, by estimating revised coordinates for the set of coordinates through observing, using the plurality of cameras, the one of the respective different one coded visual markers from at least two different positions together with at least three other ones of the respective different one coded visual markers having respective known coordinate positions.

* * * * *